May 25, 1926.
N. T. NELSON
BRACELET
Filed Feb. 20, 1925
1,586,320
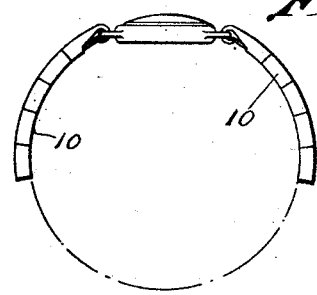
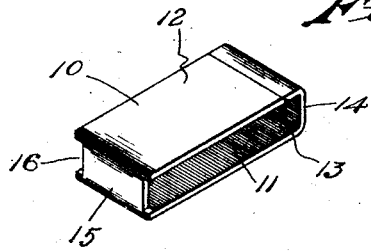
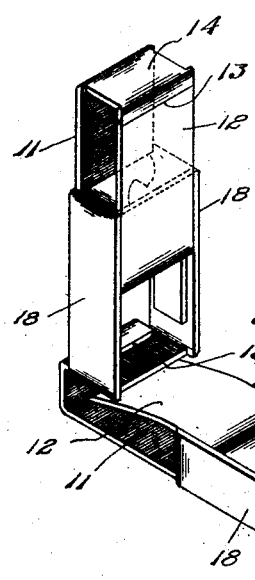
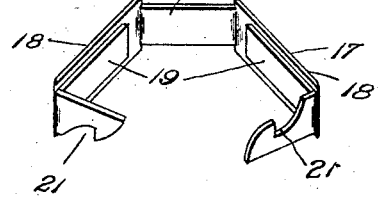
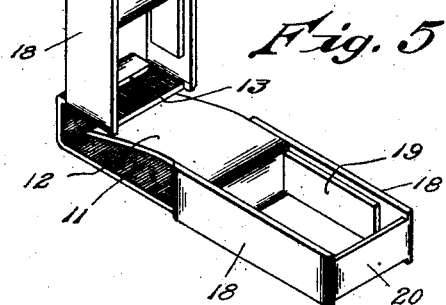
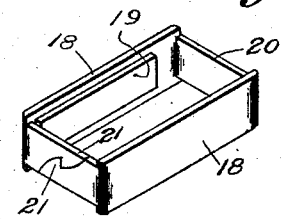
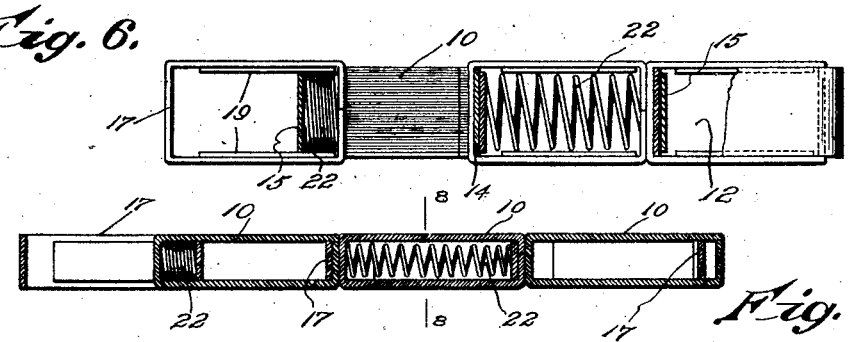
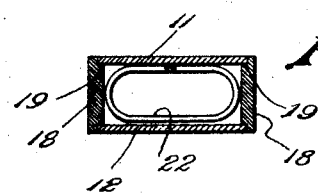
INVENTOR.
Nels T. Nelson
BY Barlow & Barlow
ATTORNEYS.

Patented May 25, 1926.

1,586,320

UNITED STATES PATENT OFFICE.

NELS T. NELSON, OF ATTLEBORO, MASSACHUSETTS, ASSIGNOR TO J. F. STURDY'S SONS CO., OF ATTLEBORO FALLS, MASSACHUSETTS, A CORPORATION OF MASSACHUSETTS.

BRACELET.

Application filed February 20, 1925. Serial No. 10,681.

This invention relates to an improved construction of extendible chain or bracelet structure, and has for its object to provide a chain of this character which comprises a series of box-shaped link units, each unit having two cooperating relatively slidable band-shaped links, one having broad top and bottom walls and the other relatively narrow cooperating side walls for closing the sides of the other link, a spring being provided for acting upon these link members to normally move them to contracted position.

A further object of this invention is the provision of means in the box link units whereby the link members comprising the different units may be manually manipulated to detachably connect them together.

A still further object of this invention is the provision of guides on the connecting band links to extend inward between the top and bottom walls of the other links providing guideways for permitting a free sliding action between these links.

The invention further consists in the provision of locking means at the ends of the connecting link whereby these ends are automatically locked together by a spring snap action.

With these and other objects in view, the invention consists of certain novel features of construction, as will be more fully described, and particularly pointed out in the appended claims.

In the accompanying drawings:

Figure 1 is a side elevation showing my improved form of link with hooks on the ends of the bracelet by which the bracelet is attached to a wrist watch.

Figure 2 is a perspective view of the band link formed with broad top and bottom walls with a relatively narrow spacing between them, this link having one of its walls cut to adapt it to be pressed or sprung inwardly to receive the next connecting link.

Figure 3 is a perspective view of the connecting band link showing its free ends as formed hook shape to be sprung into engagement and automatically locked together.

Figure 4 shows the connecting link with its ends in locked engagement.

Figure 5 is a perspective view showing a series of links connected together and one of the body band links with one of its walls bent inwardly in position to be disconnected from the connecting band link of the next box-link unit.

Figure 6 is a top view partly in section showing a plurality of links connected together, one of the link members being extended and one in contracted position and a portion of a third.

Figure 7 is a sectional edge view showing the links in position corresponding to that illustrated in Figure 6.

Figure 8 is an enlarged cross sectional elevation on line 8—8 of Figure 7.

It is found in the practical construction and operation of extendible bracelet or chain structures of this character, of advantage to provide a series of box-shaped link units, each comprising two cooperating relatively slidable band-shaped links, one having a broad or extended top wall or upper exposed surface to receive the maximum display of ornamentation and also provided with a broad under bearing surface or wall so as not to cut, abrade or injure the arm of the wearer when in engagement therewith and also to close the bottom of the link; also to provide the other or connecting band link with comparatively narrow co-operating side walls for closing the relatively narrow space between the top and bottom walls of the body link; also to provide means in these link units which is responsive to manual manipulation, whereby the links may be readily connected to and disconnected from each other to permit insertion or removal of one or more links of the chain to adjust its operating length; also to provide a spring in each link unit to act upon the different links to press them normally to contracted or closed position; and the following is a detailed description of the present embodiment of my invention and showing one means by which these advantageous results may be accomplished:—

With reference to the drawings, 10 designates the body broad band link, the same being preferably formed from a strip of sheet metal having a relatively broad upper plate or wall 11 adapted to receive the maximum amount of ornamentation on its outer surface; also a relatively broad bottom plate or wall 12 to provide an extended bearing surface and close the bottom of the link. This bottom plate or wall is preferably cut at 13 on an inclined angle to its plane, near one end thereof, thereby providing a spring plate adapted to be forced inwardly to provide an opening for the entrance or exit of the next adjacent link, and the walls of this body band link are spaced by short end walls 14 and 15 providing a narrow space to receive the guides on the connecting link, as presently described.

Each of the connecting band links 17 is provided with opposite side walls 18 which has an inwardly extending elongated bearing projection or enlargement 19 to fit in and slide longitudinally between the front and rear walls of the body band link; also this connecting band link is provided with a relatively narrow end wall 20 reduced to slide between the walls of the band link, and the free ends of this connecting link are oppositely notched as at 21 to provide interengaging hook portions adapted to be snapped one into the other for the purpose of automatically connecting these free ends together when it is ready to be snapped into position into the body link in the manner best illustrated in Figure 5.

By forming inwardly extending ways or bearing portions 19 on this connecting band link, it is held in alignment with the body link and at the same time permits free sliding movement therein.

In order to permit a flexible contracting and expanding actions of these bracelet links, I have mounted a coil spring 22 in each of the link units to act between one end of the body band and one end of the connecting band to normally press the links of each unit into contracted position and also permit an extending movement between them.

The links of my improved bracelet structure are substantially box shape in construction having relatively broad top and bottom walls to respectively receive the maximum amount or ornamentation to provide the maximum bearing surface against the flesh of the wearer and to also close the bottom of the link; also the top and bottom walls of this band link are narrowly spaced apart, the space being sufficient to receive the operating spring between them, and the sides of these body band links are closed by the connecting links which slide along the sides thereof being normally held in closed or contracted position by action of the spring mounted therein.

Then again, by my improved construction one of the walls of the body band link is cut so as to permit it to be hooked into and so readily connected to the adjacent link of the next unit, thereby providing means whereby one or more of the links may be readily connected to or detached from the bracelet or chain to readily adjust its operating length.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In an extensible bracelet structure, a series of box-shaped units each comprising relatively slidable band links one of said links having inward projections engaging and supporting the walls of the other link, said other link having a transverse split in one of its supported walls at such a point that when said links are extended said split wall may be pressed inwardly for attachment and detachment but when said links are in contracted position said projections support said split wall against inward movement.

2. An extendible bracelet structure comprising a series of band links having broad, top and bottom walls, connecting band links having side walls with inwardly-extending guide ways extending longitudinally along said walls for slidably engaging said top and bottom walls of the broad band link, and spring means for pressing said links to contracted position.

3. A bracelet structure comprising a series of band links having broad top and bottom walls, connecting links slidable in said band links and having side walls to normally close the sides of said band link said links cooperating to form box-shaped units substantially rectangular in cross section, the ends of said connecting link being locked together by a spring snap catch, and springs normally pressing said links to closed position.

4. An extendible bracelet structure comprising a series of band links having broad, top and bottom walls, connecting band links having side walls with inwardly-extending guide ways extending longitudinally along said walls and spaced from one end thereof for slidably engaging said top and bottom walls of the broad band link, and spring means for pressing said links to contracted position.

5. An extendible bracelet structure comprising a series of band links having broad, top and bottom walls, end walls connecting said top and bottom walls, connecting band links having side walls with inwardly-extending guide ways extending longitudinally along said walls and spaced from one end thereof for slidably engaging said top and bottom walls of the broad band link, one of said end walls being recessed to receive said guide and the other of said end walls being located in the said space at the end of said guides to have a free pivotal action about the end wall of said connecting band link, and spring means for pressing said links to contracted position.

6. A bracelet structure comprising a series of band links having broad top and bottom walls, connecting links slidable in said band links and having side walls to normally close the sides of said band link, said links cooperating to form box-shaped units substantially rectangular in cross section, the ends of said connecting link each being formed in hook-shape and interlocked together and held together by the inherent opening tension of the stock.

In testimony whereof I affix my signature.

NELS T. NELSON.